United States Patent
Ko et al.

(10) Patent No.: US 8,922,619 B2
(45) Date of Patent: Dec. 30, 2014

(54) UNMANNED MONITORING SYSTEM AND MONITORING METHOD USING OMNI-DIRECTIONAL CAMERA

(75) Inventors: Byoung-Chul Ko, Seoul (KR); Kwang-Choon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 2536 days.

(21) Appl. No.: 11/489,191

(22) Filed: Jul. 19, 2006

(65) Prior Publication Data

US 2007/0035617 A1 Feb. 15, 2007

(30) Foreign Application Priority Data

Aug. 9, 2005 (KR) .................. 10-2005-0072872

(51) Int. Cl.
| | |
|---|---|
| H04N 7/00 | (2011.01) |
| H04N 5/232 | (2006.01) |
| G06K 9/00 | (2006.01) |
| G06T 7/20 | (2006.01) |
| G08B 13/196 | (2006.01) |

(52) U.S. Cl.
CPC ........ *H04N 5/23238* (2013.01); *G06K 9/00771* (2013.01); *G06T 7/20* (2013.01); *G08B 13/19628* (2013.01); *G08B 13/19663* (2013.01)
USPC .................. 348/36; 348/39; 352/69; 396/436

(58) Field of Classification Search
USPC .......................................... 348/36
See application file for complete search history.

(56) References Cited

U.S. PATENT DOCUMENTS

| | | | | |
|---|---|---|---|---|
| 6,331,869 | B1 * | 12/2001 | Furlan et al. ................... | 348/36 |
| 6,466,254 | B1 * | 10/2002 | Furlan et al. ................... | 348/36 |
| 6,924,832 | B1 * | 8/2005 | Shiffer et al. .................. | 348/36 |
| 7,242,425 | B2 * | 7/2007 | Driscoll et al. ............ | 348/207.1 |
| 7,884,849 | B2 * | 2/2011 | Yin et al. ...................... | 348/143 |
| 2003/0071891 | A1 * | 4/2003 | Geng ............................. | 348/39 |
| 2006/0083305 | A1 * | 4/2006 | Dougherty et al. ...... | 375/240.12 |

FOREIGN PATENT DOCUMENTS

| | | | |
|---|---|---|---|
| KR | 120010016639 | * | 3/2001 |
| KR | 1020010016639 | * | 3/2001 |

* cited by examiner

*Primary Examiner* — Jessica M Prince
(74) *Attorney, Agent, or Firm* — The Farrell Law Firm, P.C.

(57) ABSTRACT

Disclosed are an unmanned monitoring system and a monitoring method for performing 360° unmanned monitoring work in equipment having a low storage capacity, such as a robot, by using one omni-directional camera. When an image is input through the omni-directional camera, a movement of an object is detected from the image. Then, the movement region is sampled by tracing the object and the image for the movement region is rotated into a frontal image while compensating for inclination of the image in order to allow a user to easily view the image. Thus, the frontal image is transmitted to a mobile communication terminal of a user, such as a mobile phone or a PDA.

29 Claims, 7 Drawing Sheets

UNMANNED MONITORING SYSTEM AND MONITORING METHOD USING OMNI-DIRECTIONAL CAMERA

PRIORITY

This application claims the benefit under 35 U.S.C. 119(a) of an application entitled "Unmanned Monitoring System And Monitoring Method Using Omni-Directional Camera" filed with the Korean Intellectual Property Office on Aug. 9, 2005 and assigned Serial No. 2005-72872, the contents of which are incorporated herein by reference.

BACKGROUND OF THE INVENTION

1. Field of the Invention

The present invention relates to an unmanned monitoring system and a monitoring method using an omni-directional camera. More particularly, the present invention relates to an unmanned monitoring system and a monitoring method for performing 360° unmanned monitoring work using one omni-directional camera.

2. Description of the Related Art

As modern society has rapidly developed and become more complex, there is a need to protect and monitor human and/or technology resources. In this regard, a security and monitoring system plays an important role. Performance of the security and monitoring system depends on the automation level and quality of images obtained from the system. For instance, the security and monitoring system is increasingly utilized in various fields, such as entrances of offices or companies, public hallways in financial agencies, and crossroads. In addition, the monitoring system is used for obtaining images or pictures to be used as evidence.

Recently, various technologies have been developed for monitoring systems. One is a monitoring system equipped with an omni-directional camera, called a "panoramic visual surveillance system". Different from other monitoring systems, the panoramic visual surveillance system can obtain panoramic videos from all directions by using the omni-directional camera, so that it is easy to automatically trace or detect moving objects.

A monitoring system equipped with one omni-directional camera and a plurality of active cameras has been provided. This monitoring system traces the moving object in all directions using the omni-directional camera and monitors the moving object by simultaneously controlling the active cameras having pan, tilt and zoom functions.

However, the above panoramic visual surveillance system must convert the circular 360° image of the omni-directional camera into the linear panoramic image so as to allow a user to easily detect the moving object based on the linear panoramic image. That is, the circular 360° image as shown in FIG. 1A is converted into the linear panoramic image as shown in FIG. 1B. In order to convert the circular image into the linear panoramic image, coordinate conversion of the image must be performed several times. The coordinate conversion requires high precision, and a relatively long processing time to compensate for parts not having pixels when producing the linear panoramic image, which causes low resolution and degradation of monitoring performance.

In the case of the monitoring system equipped with one omni-directional camera and a plurality of active cameras, as shown in FIG. 2, it is necessary to install pan and tilt cameras 20, 30 and 40 in addition to the omni-directional camera 10 and to provide software in order to control the above cameras. Thus, the monitoring system is inefficient in view of power consumption and software when it is installed in equipment having a low storage capacity, such as a robot.

The conventional panoramic visual surveillance system requires relatively long software processing time when it is applied to a large monitoring region, causes low resolution and degradation of performance. The conventional monitoring system equipped with one omni-directional camera and a plurality of active cameras is inefficient for automatically detecting and tracing a moving object or an intruder in a predetermined region.

SUMMARY OF THE INVENTION

The present invention has been designed to solve the above-mentioned problems with the prior art. An object of the present invention is to provide an unmanned monitoring system and a monitoring method for performing 360° unmanned monitoring using only one omni-directional camera.

Another object of the present invention is to provide an unmanned monitoring system and a monitoring method capable of detecting and tracing the direction of a moving object using an omni-directional camera while increasing a speed for processing an image by optimizing the detecting procedure for the moving object.

Still another object of the present invention is to provide an unmanned monitoring system and a monitoring method using an omni-directional camera, which are suitable for equipment having a low storage capacity, such as a robot.

To accomplish these objectives, according to one aspect of the present invention, an unmanned monitoring method has been developed using an omni-directional camera. The unmanned monitoring method includes receiving a 360° image representing a 360° visual field; selecting a movement region as a movement detection region from the 360° image; calculating an inclination angle of the movement detection region on a basis of a center point of the 360° image and rotating the movement detection region while compensating for the inclination angle of the movement detection region, thereby obtaining a frontal image; normalizing the frontal image such that a size of the frontal image is established within a predetermined standard; and transmitting the normalized frontal image to a predetermined destination.

According to another aspect of the present invention, there is provided an unmanned monitoring system using an omni-directional camera, the unmanned monitoring system including an image input module for receiving a 360° image representing a 360° visual field; a movement detection module for receiving the 360° image from the image input module so as to detect a movement region from the 360° image; a mapping process module for receiving information of the movement region from the movement detection module so as to map the information onto the 360° image received from the image input module; an image sampling module for sampling an image having a predetermined size about the movement region; an image rotating module for rotating the sampling image so as to compensate for inclination between centers of the 360° image and the sampling image; an image normalizing module for normalizing the image rotated by the image rotating module in such a manner that the image has a size within a predetermined standard size; and a transmission module receiving the normalized image from the image normalizing module and transmitting the normalized image to a predetermined destination.

BRIEF DESCRIPTION OF THE DRAWINGS

The above and other objects, features and advantages of the present invention will be more apparent from the following detailed description conjunction with the accompanying drawings, in which.

DETAILED DESCRIPTION OF THE PREFERRED EMBODIMENTS

Figure 1A:
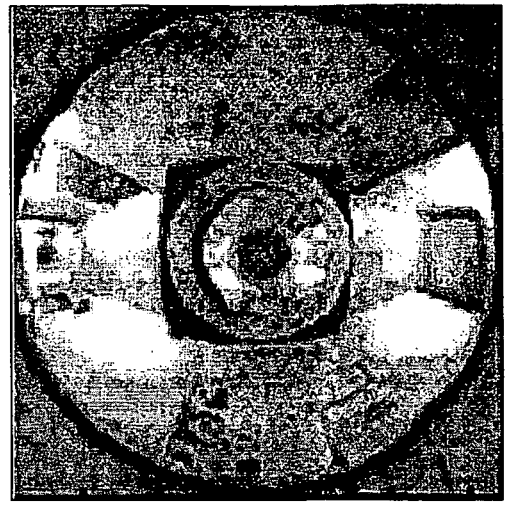
FIGS. 1A and 1B illustrates video images obtained from a conventional panoramic video surveillance system.
Figure 1B:
Figure 2:
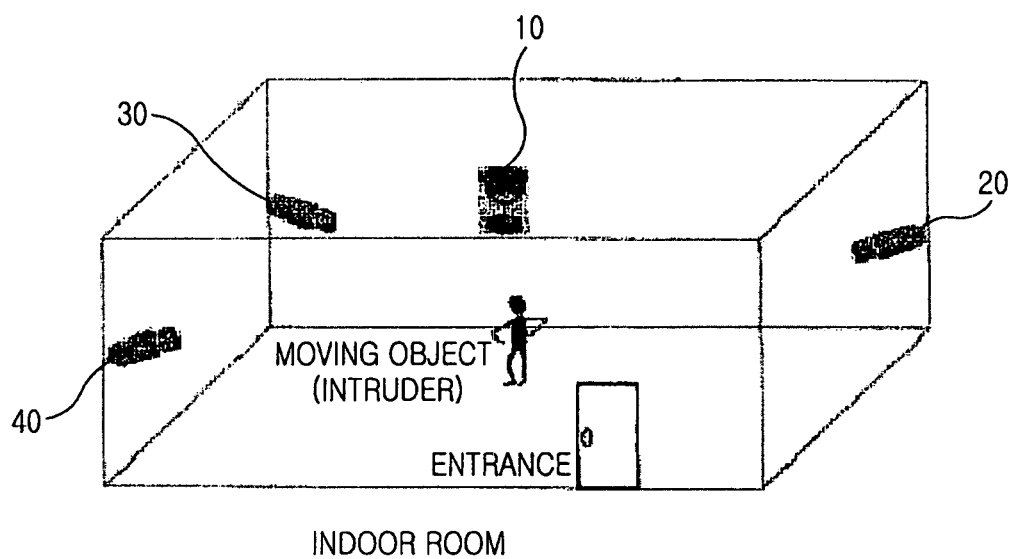
FIG. 2 illustrates an arrangement of a conventional monitoring system equipped with an omni-directional camera and a plurality of active cameras.

Hereinafter, embodiments of the present invention will be described with reference to the accompanying drawings. In the following detailed description, a detailed description of known functions and configurations incorporated herein will be omitted when it may make the subject matter of the present invention rather unclear.

The present invention provides a system and a method for performing 360° unmanned monitoring work within equipment having a low storage capacity, such as a robot, by using only one omni-directional camera. The present invention detects the movement of an object from an image obtained by the omni-directional camera installed in equipment having a low storage capacity. The present invention traces the moving object, samples a region where the movement of the object occurs (hereinafter, referred to as a movement region), rotates the image into a frontal image while compensating for the inclination of the image in such a manner that the user can easily detect the moving object, and transmits the image into a mobile communication terminal of a user, such as a mobile phone or a Personal Digital Assistant (PDA).

In the prior art, the processing speed for the image is lowered because the image obtained from the omni-directional camera must be converted into a panorama image. The present invention instantly detects and samples the movement region, and traces the direction of the moving object, thereby rapidly and precisely detecting the moving object within a short period of time.

The unmanned monitoring method uses a single omni-directional camera according to the present invention and can omit the step of converting the circular image into the linear panoramic image, thereby reducing processing time for the image. When the movement of the object simultaneously occurs in at least two regions, an ROI is selected from among the regions. The ROI is sampled and rotated and then transmitted to the mobile communication terminal of the user, so that time for checking an error can be reduced and an amount of data to be transmitted can be minimized.

The present invention includes a process for detecting the movement of the object from the image and a process for sampling a movement region.

The process for detecting the movement of the object includes the steps of detecting the movement of the object from the 360° circular image and estimating an angle of a movement region. In addition, the sampling process includes sampling a movement region, rotating an image of the movement region such that the user can easily detect the moving object from the image, and normalizing the image such that it can be transmitted to the mobile communication terminal of the user.

According to the present invention, the movement of the object is detected from the 360° circular image without converting the 360° circular image into the linear panoramic image. In general, the 360° circular image used in the present invention has a video graphics adapter (VGA) level (640×480) size. The 360° circular image shows all visual fields of 360° in one shot. If the 360° circular image has a size below the VGA level, it is difficult to recognize the object.

Figure 3:
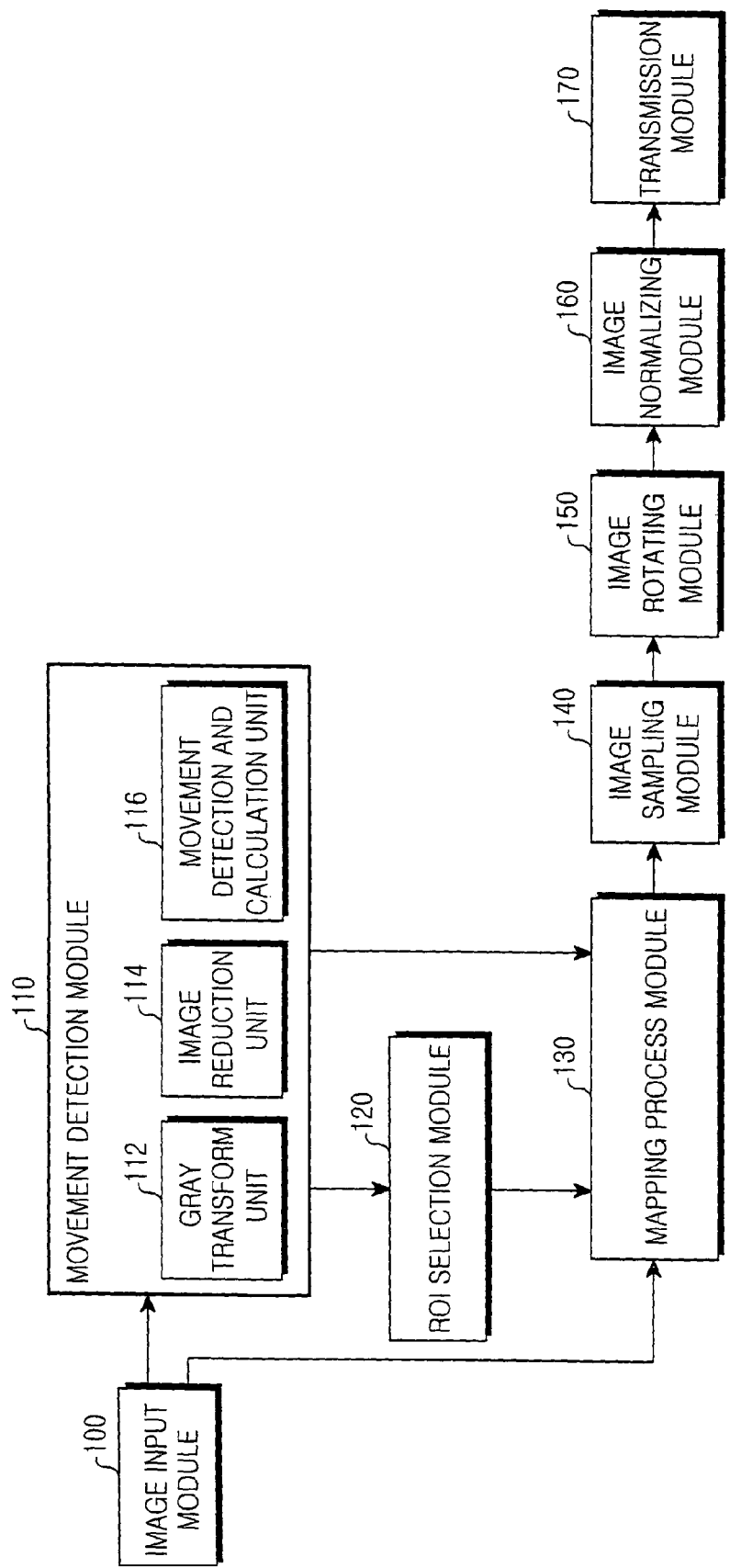
FIG. 3 illustrates the internal structure of an unmanned monitoring system according to the present invention.
Figure 4:
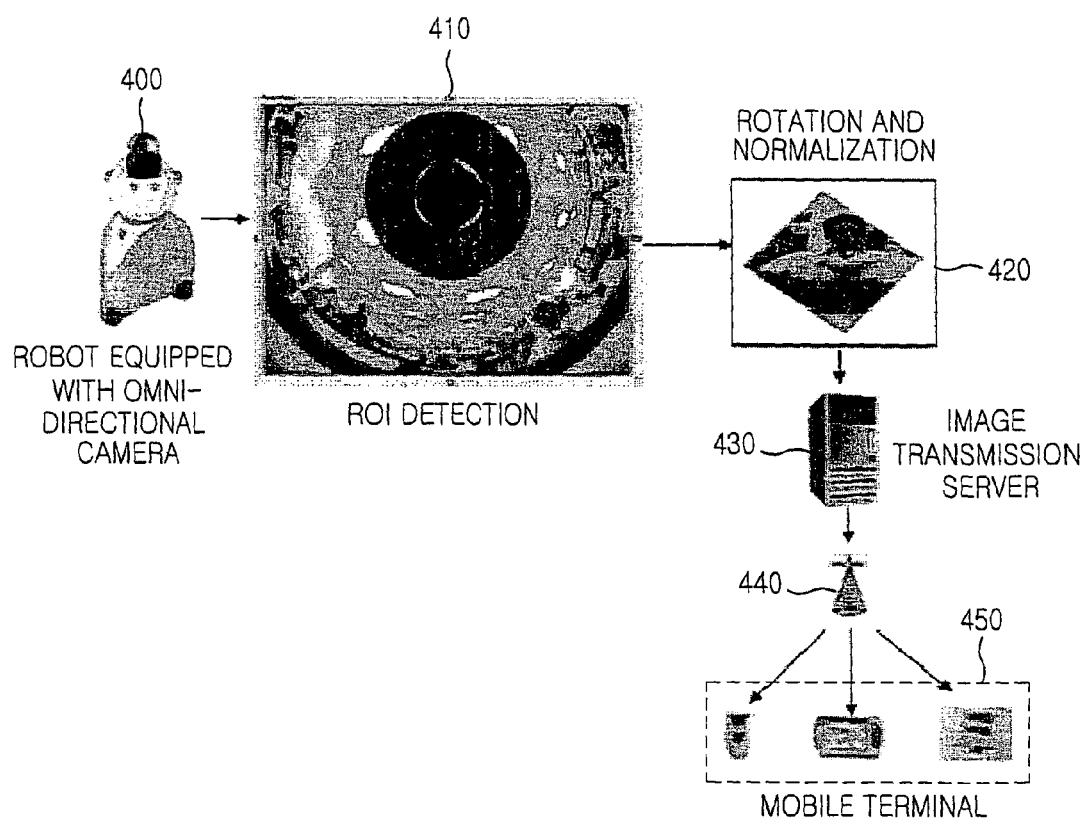
FIG. 4 illustrates a transmission procedure of a monitoring result for a moving object in an unmanned monitoring system according to the present invention.

The structure and operation of the unmanned monitoring system according to the present invention will be described with reference to FIGS. 3 and 4. FIG. 3 illustrates the internal structure of the unmanned monitoring system according to the present invention and FIG. 4 illustrates a transmission procedure of a monitoring result for the moving object in the unmanned monitoring system according to the present invention.

Referring to FIG. 3, the unmanned monitoring system includes an image input module 100, a movement detecting module 110, an ROI selection module 120, a mapping process module 130, an image sampling module 140, an image rotating module 150, an image normalizing module 160, and a transmission module 170.

The image input module 100 refers to an omni-directional camera or the like capable of photographing a 360° image. As shown in FIG. 4, the omni-directional camera 400 can be installed in equipment having a low storage capacity, such as a robot. The image input module 100 receives the 360° image having a donut shape as shown in FIG. 4 with reference numeral 410.

The 360° image is then simultaneously transferred to the movement detecting module 110 and the mapping process module 130.

Upon receiving the 360° image from the image input module 100, the movement detecting module 110 detects a movement region from the 360° image. The movement detecting module 110 transfers position information of the region to the mapping process module 130 if there is only one movement region. If there are at least two movement regions, the movement detecting module 110 transfers position information of the regions to the ROI selection module 130.

The 360° image which is transferred to the movement detecting module 110 has color components of R, G and B, a gray transform unit 112 of the movement detecting module 110 transforms the 360° image into a gray image and then noise contained in the image is removed by using a Gaussian filter. At this time, relatively long processing times are is necessary in order to precisely measure the movement of the object from the image having a size of 640×480. For this reason, the present invention provides an image reduction unit 114, which reduces the size of the gray image in a predetermined ratio in order to establish a less complex algorithm more suitable for an embedded system. For instance, the size of the gray image is reduced into a QQVGA level (160×120) which corresponds to ¼ of the VGA level. In this case, an amount of algorithms need to process the image can be reduced by a factor of 4, so that the processing time for the image can be shortened.

Then, the image reduction unit 114 sends the image to a movement detection and calculation unit 116, so that the movement detection and calculation unit 116 detects the movement of the object by comparing a present image with a previous image. The movement detection and calculation unit 116 divides the 360° image into block images having a predetermined size and detects the movement of the object through a sum of absolute difference (SAD) scheme which detects an amount of variation based on sum of variation of the image.

The movement detection and calculation unit 116 divides the image which has a size of QQVGA level into block images with a size of 5×5 pixels and measures an amount of variation between blocks based on the previous image (P) and the present image (I). According to the present invention, in a SAD scheme the measure the amount of variation is determined by Equation (1). As described above, the SAD scheme divides the image into block images having a predetermined size and detects an amount of variation based on the sum of variation between the blocks.

$$I_{x-2 \sim x+2, y-2 \sim y+2} = \begin{cases} 255 \text{ if } \left( \sum_{y=y-2}^{y=y+2} \sum_{x=x-2}^{x=x+2} |P_{x,y} - I_{x,y}| \geq T \right) \\ 0 \end{cases} \quad (1)$$

In Equation 1, P represents the previous image, T represents a threshold value and I represents the present image. Equation 1 shows that a value of 255 is applied to corresponding pixels if a pixel difference between measured blocks exceeds a threshold value and 0 is applied to the corresponding pixels if the pixel difference between measured blocks is equal to or less than the threshold value.

The above value is applied to each pixel based on the fact that movement regions may represent a pixel difference larger than that of the other regions, so that brightness of the image can be improved over the whole area of the image.

If movement of the object is detected from the image, the movement detecting module 110 transfers information of the movement region to the mapping process module 130. Upon receiving the information from the movement detecting module 110, the mapping process module 130 maps the information onto the 360° image, which is transmitted to the mapping process module 130 from the image input module 100. Thus, it is possible to recognize the position of the region in the original image based on position information of the region obtained from the image having the reduced size.

If there is only one movement region, the image of the object is transmitted to the user by processing the image. When there are at least two movement regions, it is preferred to differentiate the movement regions by performing labeling work with respect to the regions. Thus, when the movement of the object is detected from plural regions in the donut shape image as shown in FIG. 4 with reference numeral 410, the ROI selection module 120 selects the ROI from the plural regions and transfers information related to the ROI to the mapping process module 130 for the purpose of image mapping. In other words, if the movement detection module 110 detects at least two movement regions, the ROI selection module 120 performs labeling work with respect to the movement regions and selects the ROI for the unmanned monitoring operation. To this end, the ROI selection module 120 selects a movement region representing the highest sum of the movement size and the movement degree as the ROI. The movement size is determined according to the difference of the pixel numbers between the previous image and the present image of the movement region. The movement degree is determined by the difference of the pixel value between the previous image and the present image of the movement region.

In this manner, the mapping process module 130 receives information related to the movement region from the movement detection module 110 or movement information of the movement regions from the ROI selection module 120 and maps the information onto the original image. The movement information includes position information of the movement regions and movement algorithm information of the movement regions.

When the information has been mapped onto the original image by the mapping process module 130, the image sampling module 140 samples an image about the movement region in a predetermined size. The image sampling module 140 samples the image in transverse and longitudinal directions about the center point of the movement region in a predetermined size (dx×dy). That is, a part of the original image is sampled about the mapping region, thereby selecting one movement detection region.

The sampling image is transferred to the image rotating module 150. The image rotating module 150 rotates the sampling image while compensating for the rotating angle between the center point of the sampling image and the center point of the 360° image.

Since the movement region detected by the movement detection module 110 or the ROI (which is also referred to as a movement detection region) selected by the ROI selection module 120 is a part of the 360° image having the donut shape, the movement region or the ROI may be inclined. In this case, it is necessary to rotate the inclined image in a degree corresponding to the inclination of the image so as to allow the user to correctly view the image.

Thus, the image rotating module 150 detects the center point of the movement detection region from the 360° image and calculates the inclination angle of the movement detection region about the center point. The calculated inclination angle is utilized later when compensating for inclination of the movement detection region.

In order to obtain the inclination angle a radian value must be estimated as follows according to Equation (2):

$$radian = a\tan 2(dy, dx) \quad (2)$$

In Equation 2, dx refers to an amount of movement in the X-axis direction from the center point of the 360° image, and dy refers to an amount of movement in the Y-axis direction from the center point of the 360° image. When dx and dy are applied to Equation 2, the radian is in a range between $-\pi$ to $\pi$. Equation 3 is used in order to convert the radian into an angular value As set forth in Equation (3):

$$angle(\angle) = radian \times (180/\pi) \quad (3)$$

If the radian value obtained through Equation (2) is applied to Equation (3), the inclination angle can be obtained. If the resultant value obtained through Equation (3) is a negative number, the inclination angle must be recalculated again by using Equation (4) as follows:

$$angle(\angle) = 180 + (angle \times (-1)) \quad (4)$$

Equation (4) is used to convert a negative value of an inclination angle into a positive value. Thus, the inclination angle in the range of 0 to 360° is obtained through Equations (3) and (4).

The image rotating module 150 rotates the sampling image so as to allow the user to correctly view the image in front of the image. In order to compensate for the angle of the sampling image, it is necessary to calculate a rotating angle ($\theta$) for the sampling image by using a present angle of the sampling image obtained through Equations (3) and (4). The rotating angle is calculated as follows according to Equation (5) as follows:

(1) 0<angle<90:θ=360−(90−angle)

(2) 91<angle<180:θ=angle−90

(3) 181<angle<270:θ=(angle−180)+90

(4) 271<angle<360:θ=(angle−270)+180      (5)

If the present angle of the sampling image obtained through Equations 3 and 4 is applied to Equation 5, the rotating angle (0) can be calculated. When the rotating angle (0) is applied to Equation 6, it is possible to obtain the frontal image while compensating for the inclination angle. The value is calculated according to Equation (6) as follows:

$$x_2 = \cos(\theta)*(x_1-x_0) - \sin(\theta)*(y_1-y_0) + x_0$$

$$y_2 = \sin(\theta)*(x_1-x_0) - \cos(\theta)*(y_1-y_0) + y_0 \qquad (6)$$

where, $x_2$ and $y_2$ refer to the rotating position of the pixel, $x_1$ and $y_1$ refer to the present position of the pixel, and $x_0$ and $y_0$ refer to the zero point.

The image is rotated by the image rotating module 150 through the above procedure and is transferred to the image normalizing module 160. The image normalizing module 160 normalizes the image rotated by the image rotating module 150 in a predetermined standard size. The image normalizing module 160 normalizes the rotated image in a predetermined standard size of 176×144, that is, in such a manner that maximum sizes of the transverse axis and the longitudinal axis of the rotated image are established within a predetermined standard size. Thus, the image can be transmitted to the mobile communication terminal of the user, such as a mobile phone or a PDA. The predetermined standard size for the transverse axis and the longitudinal axis of the rotated image refers to a Quarter Common Intermediate Format (QCIF) size (176×144 pixels).

Therefore, the normalized image can be obtained through the image normalizing module 160 as shown in FIG. 4 with reference numeral 420. The normalized image is transmitted to the destination through the transmission module 170. According to the present invention, the destination is either an image transmission server 430 or a mobile communication terminal 450. If the normalized image is transmitted to the image transmission server 430 through the transmission module 170, the normalized image is stored in a database of the image transmission server 430 to allow the user accessing the image transmission server 430 to check the unmanned monitoring result. In contrast, the normalized image, that is, the unmanned monitoring result can be transmitted to the mobile communication terminal 450 through a streaming scheme together with a Short Message Service (SMS) text message by way of a mobile network 440, such as a base station.

Figure 5:
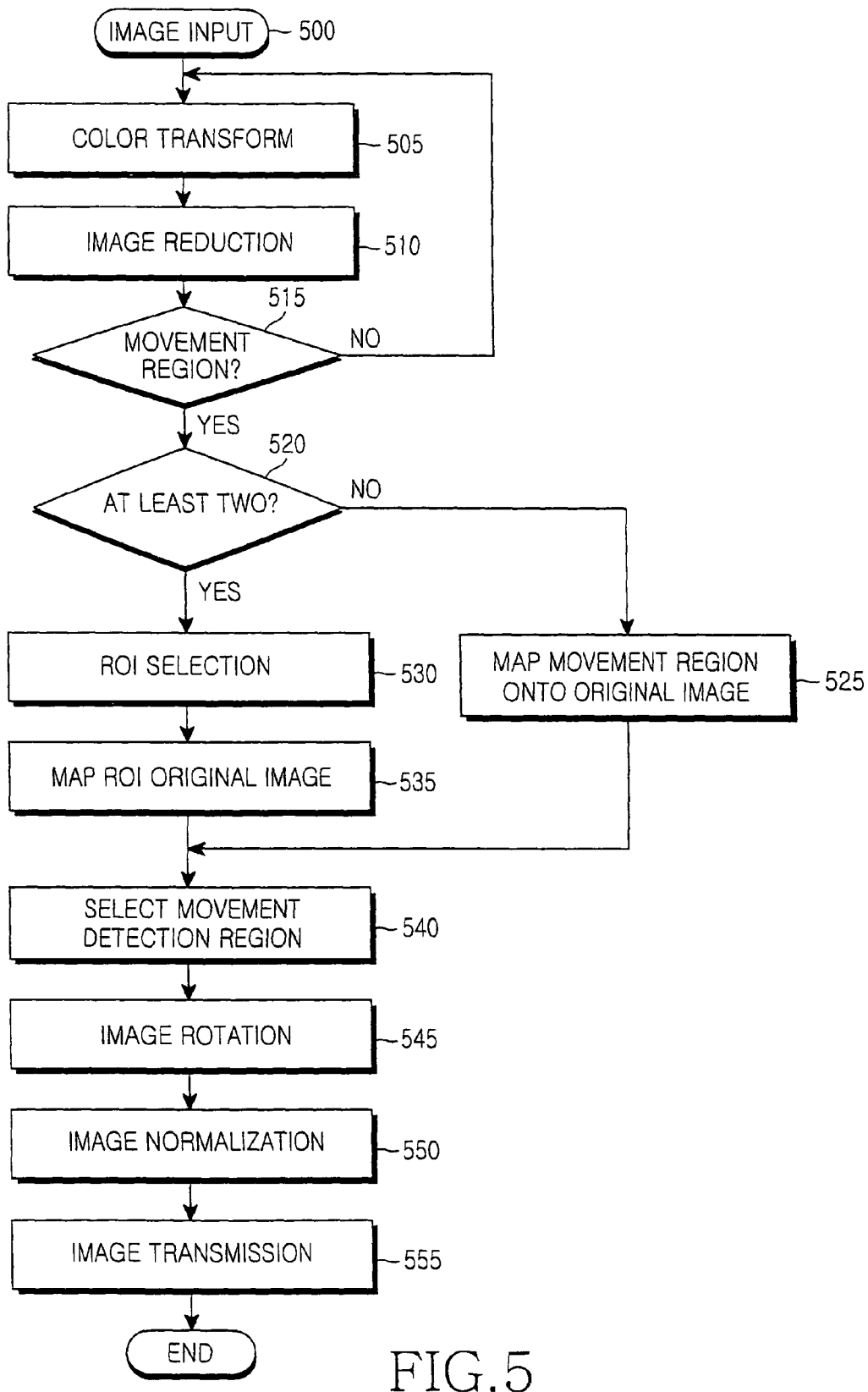
FIG. 5 illustrates a monitoring procedure in an unmanned monitoring system according to the present invention.

The control procedure for transmitting the unmanned monitoring result in the unmanned monitoring system having the above structure will be described with reference to FIG. 5. FIG. 5 illustrates the monitoring procedure in the unmanned monitoring system according the present invention.

First, the image input module 100 receives the image from the omni-directional camera (step 500). Then, since the image has the R, G and B components, the movement detection module 110 transforms the image into a gray image (step 505). Step 505 is performed by the gray transform unit 112 of the movement detection module 110. The reason for converting the image into the gray image is to facilitate detection of an object in a dark place because brightness components mixed in the R, G and B colors make it difficult to detect the object in the dark place.

Then, the image reduction unit 114 of the movement detection module 110 reduces the size of the image in order to reduce an amount of algorithms after removing noise from the image by using the Gaussian filter (step 510). At this time, the size of the image is reduced into a QQVGA level (160×120) which corresponds to ¼ of the original image.

When the 360° image has been reduced, the movement detection and calculation unit 116 determines if there is the movement region (step 515). The movement region can be detected by measuring an amount of variation between corresponding blocks of the previous image and the present image through the SAD.

If the movement region has been detected by the elements of the movement detection module 110, it is determined if there are at least two movement regions (step 520). If it is determined in step 520 that there is only one movement region, the movement detection module 110 provides position information of the movement region to the mapping process module 130. The mapping process module 130 maps the movement region onto the original image (step 525). In contrast, if it is determined in step 520 that there are at least two movement regions, the movement detection module 110 transfers information of the movement regions to the ROI selection module 120. Thus, the ROI selection module 120 selects the ROI for unmanned monitoring from among the movement regions (step 530).

If at least two movement regions are detected, one of them must be selected. In this case, the ROI selection module 120 performs labeling work with respect to at least two movement regions. Next, the ROI selection module 120 selects a movement region representing the highest sum of the movement size and the movement degree as the ROI.

Figure 6:
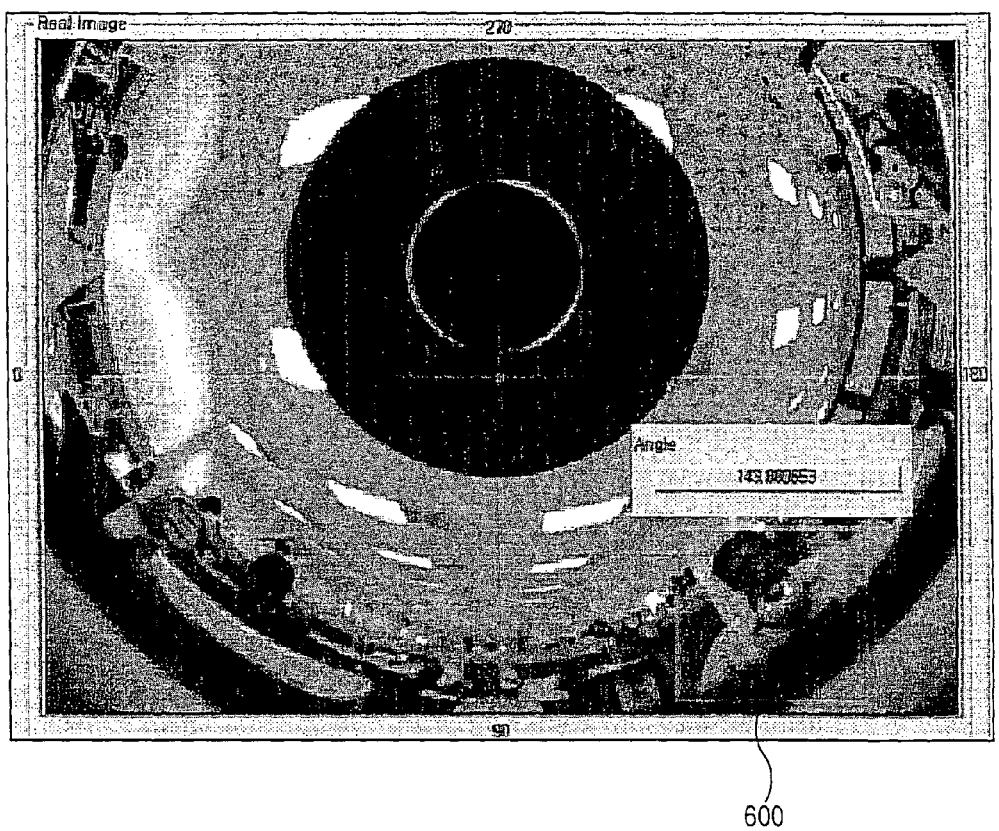
FIG. 6 illustrates a Region of Interest (ROI) according to the present invention.

For instance, as shown in FIG. 6, if the 360° donut shape image has been input, the movement regions are detected from the 360° image, and then a movement region 600 representing the highest sum of the movement size and the movement degree is selected as the ROI.

Next, the ROI selection module 120 sends information related to the ROI selection to the mapping process module 130, so that the mapping process module 130 maps the ROI onto the original image (step 535). Then, the image sampling module 140 samples the image in a predetermined size about the mapping region and determines the sampling region as a movement detection region (step 540). The term "sampling" refers to the process of selecting and clipping a predetermined region of the image in transverse and longitudinal directions about the center point of the mapping region in a predetermined size (dx×dy).

Figure 7A:
FIGS. 7A to 7C illustrates a sampled ROI, a frontal image and a normalized image thereof according to the present invention.

The sampling image selected as the movement detection region is shown in FIG. 7A. The sampling image is a part of the 360° image which has a donut shape, so the sampling image may be an inclined image. Thus, if the sampling image is provided to the image rotating module 150, the image rotating module 150 rotates the sampling image shown in FIG. 7A into a frontal image while compensating for the inclination of the sampling image to allow the user to easily view the image. The image rotating module 150 detects the center point of the sampling image from the 360° image and calculates the inclination angle of the sampling image about the center point. Then, the rotating angle required for rotating the sampling image into the frontal image is calculated based on the inclination angle of the sampling image. The sampling image as shown in FIG. 7A can be converted into the frontal image as shown in FIG. 7B by using the rotating angle.

Figure 7B:
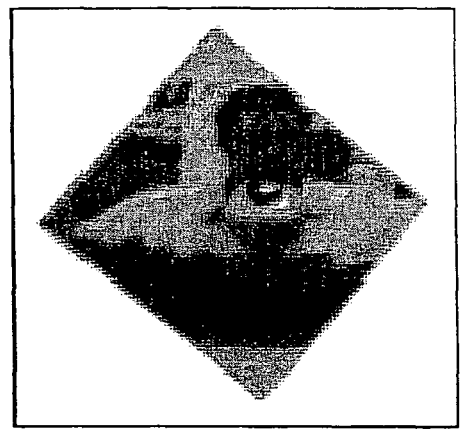

When the frontal image shown in FIG. 7B has been obtained, the image normalizing module 160 normalizes the image (step 550). Such image normalization is necessary to set maximum sizes of the transverse axis and longitudinal axis of the rotated image within the predetermined standard sizes for the transverse axis and longitudinal axis.

Figure 7C:
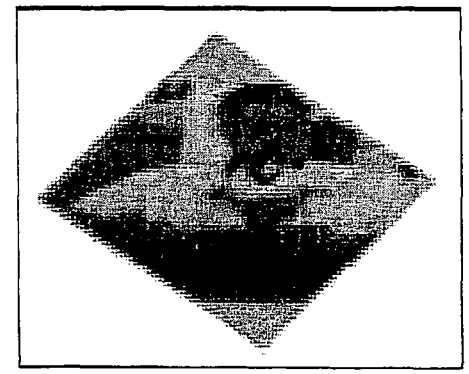

The size of the frontal image shown in FIG. 7B is normalized into a size of QCIF to transmit the frontal image to the mobile communication terminal of the user. FIG. 7C shows the normalized image being a different size from that of the frontal image shown in FIG. 7B.

Upon receiving the normalized image, the transmission module 170 transmits the normalized image to the mobile communication terminal of the user (step 555). The transmission of the normalized image can be performed during a predetermined period or an output time of the unmanned monitoring result. In addition, the unmanned monitoring result is sent to a server and stored in a database so that the user can check the unmanned monitoring result later. Otherwise, the unmanned monitoring result can be transmitted to the mobile communication terminal of the user whenever the unmanned monitoring result is output.

According to the present invention, the omni-directional camera is equipped in equipment having a low storage capacity, for the purpose of unmanned monitoring, so that the movement of the object can be detected in the 360° direction using only one camera. In particular, the movement of the object is instantly detected from the 360° image without converting the 360° image into the panoramic image, so that the object can be effectively monitored within a short period of time. Furthermore, if the movement of the object simultaneously occurs in various regions, the ROI is selected from among the movement regions and then the ROI is sampled and rotated so as to transmit the image to the robot. Thus, a robot can transmit the precise monitoring result to a user's mobile communication terminal while minimizing an amount of data to be transmitted to the mobile communication terminal.

The present invention can effectively reduce the processing steps for detecting the movement of the object, thereby minimizing the processing time. Since the user can use the unmanned monitoring result stored in the server's database the storage capacity for the unmanned monitoring result can be minimized. The unmanned monitoring method according to the present invention can be easily applied to the mobile communication terminal or the embedded robot having a limited processor or a low storage capacity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An unmanned monitoring method using an omni-directional camera, the unmanned monitoring method comprising the steps of:
   receiving a 360° image representing a 360° visual field;
   determining if there is a movement of an object in the 360° image;
   extracting a movement detection region where the movement of the object occurs from the 360° image;
   calculating an inclination angle of the movement detection region and rotating the movement detection region to compensate for the inclination angle of the movement detection region, thereby obtaining a frontal image;
   normalizing the frontal image such that a size of the frontal image is established within a predetermined standard; and
   transmitting the normalized frontal image to a predetermined destination,
   wherein, if there are at least two movement detection regions, the extracted movement detection region represents a highest sum of a movement size and a movement degree from among the at least two movement detection regions.

2. The unmanned monitoring method as claimed in claim 1, wherein the movement size is determined according to a difference of a pixel number between a previous image and a present image of the movement detection region.

3. The unmanned monitoring method as claimed in claim 1, wherein the movement degree is determined according to a difference of a pixel value between a previous image and a present image of the movement detection region.

4. The unmanned monitoring method as claimed in claim 1, wherein the movement detection region is selected through a sum of absolute difference (SAD) scheme which divides the 360° image into block images and detects an amount of variation based on sum of variation of the block images.

5. The unmanned monitoring method as claimed in claim 4, wherein the SAD scheme is expressed as:

$$I_{x-2 \sim x+2, y-2 \sim y+2} = \begin{cases} 255 & \text{if } \left( \sum_{y=y-2}^{y=y+2} \sum_{x=x-2}^{x=x+2} |P_{x,y} - I_{x,y}| \geq T \right), \\ 0 & \end{cases}$$

wherein P represents a previous image, T represents a threshold value and I represents a present image.

6. The unmanned monitoring method as claimed in claim 1, wherein the normalizing step is performed so as to allow maximum sizes of a transverse axis and a longitudinal axis of the frontal image to be established within a predetermined standard size.

7. The unmanned monitoring method as claimed in claim 6, wherein the predetermined standard size for the transverse axis and the longitudinal axis of the frontal image is a Quarter Common Intermediate Format (QCIF) (176×144 pixels) size.

8. An unmanned monitoring method using an omni-directional camera, the unmanned monitoring method comprising the steps of:
   determining if there is a movement of an object in a 360° image;
   extracting a movement detection region where the movement of the object occurs from the 360° image;
   calculating an inclination angle of the movement detection region and rotating the movement detection region to compensate for the inclination angle of the movement detection region, thereby obtaining a frontal image;
   normalizing the frontal image such that a size of the frontal image is established within a predetermined standard; and
   transmitting the normalized frontal image to a predetermined destination,
   wherein the step of extracting the movement detection region includes:
   converting R, G, and B colors of the 360° image into a gray color;
   reducing the gray color image in a predetermined ratio while removing noise from the 360° image; and
   sampling the movement detection region in a predetermined size from the reduced image, and selecting the sampling region into the movement detection region.

9. The unmanned monitoring method as claimed in claim 8, wherein the sampling step is performed by selecting a predetermined region of the 360° image in transverse and longitudinal directions of the 360° image about a center point of the movement detection region in the predetermined size.

10. The unmanned monitoring method as claimed in claim 1, wherein the step of calculating the inclination angle of the movement detection region includes estimating a radian value and converting the radian value into an angular value.

11. The unmanned monitoring method as claimed in claim 10, wherein the radian value is obtained by:

radian=$a \tan 2(dy, dx)$, wherein dx refers to an amount of movement in an x-axis direction from a center point of the 360° image and dy refers to an amount of movement in a y axis direction from the center point of the 360° image.

12. The unmanned monitoring method as claimed in claim 11, wherein the radian value is converted into the angular value by:

angle($\angle$)=radian×(180/$\pi$).

13. The unmanned monitoring method as claimed in claim 12, wherein, if a resultant value is a negative number, an inclination angle is calculated as:

angle($\angle$)=180+(angle×(−1)).

14. The unmanned monitoring method as claimed in claim 10, wherein a rotating angle for rotating the image of the movement detection region into the frontal image to compensate for the inclination angle of the movement detection region is obtained by:

(1) 0<angle<90:θ=360−(90−angle)

(2) 91<angle<180:θ=angle−90

(3) 181<angle<270:θ=(angle−180)+90

(4) 271<angle<360:θ=(angle−270)+180, wherein the angle is a calculated angle and θ is the rotating angle.

15. The unmanned monitoring method as claimed in claim 14, wherein, when the rotating angle is obtained, the image of the movement detection region is rotated into the frontal image according to $x_2 = \cos(\theta) * (x_1 - x_0) - \sin(\theta) * (y_1 - y_0) + x_0$ $y_2 = \sin(\theta) * (x_1 - x_0) - \cos(\theta) * (y_1 - y_0) + y_0$, wherein $x_2$ and $y_2$ refer to a rotating position of a pixel, $x_1$ and $y_1$ refer to a present position of the pixel, and $x_0$ and $y_0$ refer to a zero point.

16. The unmanned monitoring method as claimed in claim 1, wherein the predetermined destination is one of an image transmission server having a database for storing the normalized image and a mobile communication terminal of a user through a mobile network.

17. An unmanned monitoring system using an omni-directional camera, the unmanned monitoring system comprising:
an image input module for receiving a 360° image representing a 360° visual field;
a movement detection module for receiving the 360° image from the image input module so as to extract a movement detection region where a movement of an object occurs from the 360° image;
a mapping process module for mapping the movement detection region from the movement detection module onto the 360° image received from the image input module;
an image sampling module for extracting an image having a predetermined size about the movement detection region from the 360° image;
an image rotating module for rotating the extracted image to compensate for an inclination angle of the extracted image;
an image normalizing module for normalizing the image rotated by the image rotating module in such a manner that the normalized image has a size within a predetermined standard size;
a transmission module receiving the normalized image from the image normalizing module and transmitting the normalized image to a predetermined destination; and
a region of interest (ROI) selection module,
wherein the ROI selection module selects an ROI from among movement detection regions if there are at least two movement detection regions detected by the movement detection module and transmits information related to the ROI to the mapping process module so as to map the information onto the image.

18. The unmanned monitoring system as claimed in claim 17, wherein the movement detection module detects the movement detection region, transfers position information of the movement detection region to the mapping process module if there is only one movement detection region, and transfers movement information of movement detection regions to the ROI selection module if there are at least two movement detection regions.

19. The unmanned monitoring system as claimed in claim 18, wherein the movement information includes position information and movement calculation information of the movement detection regions.

20. The unmanned monitoring system as claimed in claim 17, wherein the image sampling module samples a predetermined part of the movement detection region in transverse and longitudinal directions about a center point of the movement detection region in a predetermined size based on information of the movement detection region.

21. The unmanned monitoring system as claimed in claim 17, wherein the ROI selection module selects a movement detection region representing a highest sum of a movement size and a movement degree from among the movement detection region as the ROI and sends information related to the ROI to the image sampling module.

22. The unmanned monitoring system as claimed in claim 21, wherein the movement size is determined according to a difference of a pixel number between a previous image and a present image of the movement detection region.

23. The unmanned monitoring system as claimed in claim 21, wherein the movement degree is determined according to a difference of a pixel value between a previous image and a present image of the movement detection region.

24. The unmanned monitoring system as claimed in claim 17, wherein the movement detection module detects the movement detection region through a sum of absolute difference (SAD) scheme which divides the 360° image into block images and detects an amount of variation based on sum of variation of the block images.

25. The unmanned monitoring system as claimed in claim 24, wherein the SAD scheme is expressed as:

$$I_{x-2 \sim x+2, \, y-2 \sim y+2} = \begin{cases} 255 & \text{if } \left( \sum_{y=y-2}^{y=y+2} \sum_{x=x-2}^{x=x+2} |P_{x,y} - I_{x,y}| \geq T \right), \\ 0 & \end{cases}$$

wherein P represents a previous image, T represents a threshold value and I represents a present image.

26. The unmanned monitoring system as claimed in claim 17, wherein maximum sizes of a transverse axis and a longitudinal axis of a rotated image are established within a predetermined standard size by the image normalizing module.

27. The unmanned monitoring system as claimed in claim 26, wherein the predetermined standard size for the transverse axis and the longitudinal axis of the rotated image is a QCIF (176×144 pixels) size.

28. An unmanned monitoring system using an omni-directional camera, the unmanned monitoring system comprising:
   an image input module for receiving a 360° image representing a 360° visual field;
   a movement detection module for receiving the 360° image from the image input module so as to extract a movement detection region for movement of an object from the 360° image;
   a mapping process module for mapping the movement detection region from the movement detection module onto the 360° image received from the image input module;
   an image sampling module for extracting an image having a predetermined size about the movement detection region from the 360° image;
   an image rotating module for rotating the extracted image to compensate for an inclination angle of the extracted image;
   an image normalizing module for normalizing the image rotated by the image rotating module in such a manner that the normalized image has a size within a predetermined standard size; and
   a transmission module receiving the normalized image from the image normalizing module and transmitting the normalized image to a predetermined destination,
   wherein the movement detection module includes:
   a gray transform unit for converting R, G, and B colors of the 360° image into a gray color;
   an image reduction unit for reducing the gray color image in a predetermined ratio while removing noise from the 360° image; and
   a movement detection and calculation unit for extracting the movement detection region from the reduced image.

29. The unmanned monitoring system as claimed in claim 17, wherein the predetermined destination is one of an image transmission server having a database for storing the normalized image and a mobile communication terminal of a user through a mobile network.

* * * * *